United States Patent
Schnieders et al.

(10) Patent No.: US 12,261,781 B2
(45) Date of Patent: Mar. 25, 2025

(54) EFFICIENT USAGE OF A MinGBR

(71) Applicant: Deutsche Telekom AG, Bonn (DE)

(72) Inventors: Dominik Schnieders, Aachen (DE); Nico Bayer, Bad Nauheim (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/533,274

(22) Filed: Dec. 8, 2023

(65) Prior Publication Data

US 2024/0195746 A1   Jun. 13, 2024

(30) Foreign Application Priority Data

Dec. 9, 2022   (EP) ................................. 22212452

(51) Int. Cl.
*H04L 47/25* (2022.01)
*H04L 43/026* (2022.01)
*H04L 43/0894* (2022.01)

(52) U.S. Cl.
CPC ............ *H04L 47/25* (2013.01); *H04L 43/026* (2013.01); *H04L 43/0894* (2013.01)

(58) Field of Classification Search
CPC .... H04L 43/026; H04L 43/0894; H04L 47/25
See application file for complete search history.

(56) References Cited

U.S. PATENT DOCUMENTS

| | | | |
|---|---|---|---|
| 7,609,635 B2 * | 10/2009 | Bae ...................... | H04W 72/23 370/231 |
| 2016/0149815 A1 | 5/2016 | Cotter | |
| 2016/0330099 A1 * | 11/2016 | Koo ................... | H04L 43/0894 |
| 2020/0037007 A1 | 1/2020 | Mahvash et al. | |
| 2021/0184785 A1 * | 6/2021 | Small ................... | H04L 1/0002 |
| 2024/0205159 A1 * | 6/2024 | Bayer ................... | H04L 47/762 |

* cited by examiner

*Primary Examiner* — George C Neurauter, Jr.
(74) *Attorney, Agent, or Firm* — LEYDIG, VOIT & MAYER, LTD.

(57) ABSTRACT

A method for operating a communication network includes a communication network providing a sender of a distributed real-time application and a receiver of the distributed real-time application with a communication connection, the distributed real-time application defining a minimum operable data rate. The sender periodically transmits data packets to the receiver via the provided communication connection at a data rate higher than the defined minimum operable data rate. The sender steadily determines a currently available bitrate of the communication connection, and adjusts the data rate to a data rate lower than the determined currently available bitrate by a data rate offset defined by the distributed real-time application. A node of the communication network learns the defined data rate offset and provides a guaranteed minimum bitrate of the communication connection higher than a booked minimum bitrate of the communication connection by the learned data rate offset.

15 Claims, 1 Drawing Sheet

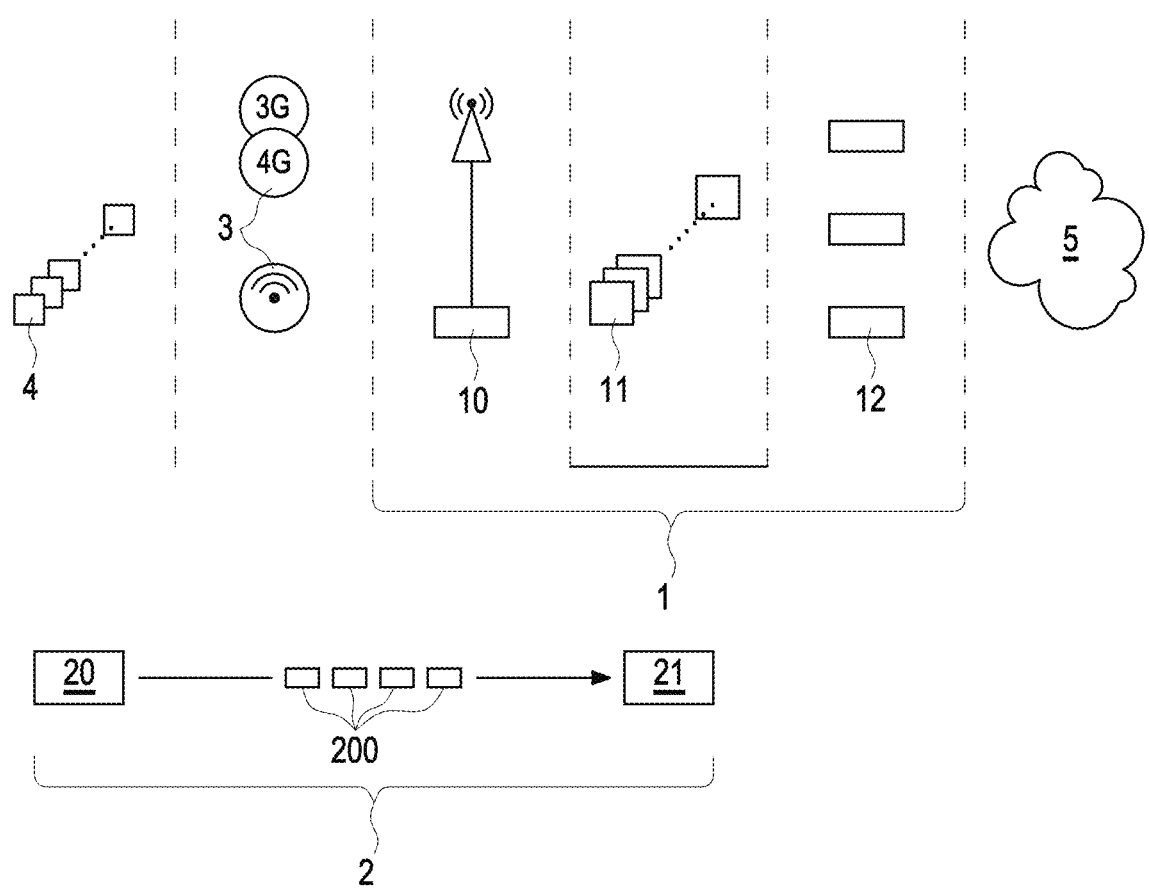

EFFICIENT USAGE OF A MinGBR

CROSS REFERENCE TO RELATED APPLICATIONS

This application claims benefit to European Patent Application No. EP 22 212 452.1, filed on Dec. 9, 2022, which is hereby incorporated by reference herein.

FIELD

The invention relates to a method for operating a communication network, wherein a communication network provides a sender of a distributed real-time application and a receiver of the distributed real-time application with a communication connection. The invention further relates to computer program products.

BACKGROUND

The distributed real-time application may also be referred to as a near-real-time-application, a time-critical application or a latency-critical application. The distributed real-time application usually comprises an application frontend and an application backend. The application frontend and the application backend may be executed by a first computing device and a second computing device, respectively, the second computing device being different and separate from the first computing device.

The application frontend and the application backend are configured for transmitting application data via the communication network. The application data usually comprises a plurality of periodically transmitted data packets. The data packets may be transmitted by the application frontend (uplink) or by the application backend (downlink). Accordingly, each of the application frontend and the application backend may be either a sender of the distributed real-time application or a receiver of the distributed real-time application.

The first and second computing devices may be connected via the communication connection provided by the communication network. The communication network, i.e., a node of the communication network dynamically allocates network resources to the communication connection. The allocated network resources depend on a current load of the communication network and a current condition of the communication connection.

The minimum operable data rate is a lowest data rate that may be required for a proper operation of the distributed real-time application. Data rates below the minimum operable data rate result in a malfunction or even in an abort of the distributed real-time application. The communication network may provide the communication connection with a guaranteed minimum bitrate by applying a MinGBR (Minimum Guaranteed BitRate) method to the connection, the guaranteed minimum bitrate being booked as the minimum operable data rate.

Apart from that, the distributed real-time application may require a low latency and a low volatility of the latency, i.e. a low and constant latency, of the communication connection. The volatility of the latency is usually referred to as a jitter of the communication connection. The latency of the communication connection is essentially determined by a queue time of a data packet passing through a queue provided by the node of the communication network. The distributed real-time application may not completely use a currently available bitrate of the communication connection in order to prevent the queue and, as a consequence, the latency or the jitter of the communication connection from increasing.

Thus, an operation of the distributed real-time application may be readily impaired by the communication connection when the currently available bitrate of the communication connection decreases and approaches the minimum operable data rate, i.e. the booked MinGBR.

SUMMARY

In an embodiment, the present disclosure provides a method for operating a communication network. The method includes a communication network providing a sender of a distributed real-time application and a receiver of the distributed real-time application with a communication connection, the distributed real-time application defining a minimum operable data rate. The sender periodically transmits data packets to the receiver via the provided communication connection at a data rate higher than the defined minimum operable data rate. The sender steadily determines a currently available bitrate of the communication connection, and adjusts the data rate to a data rate lower than the determined currently available bitrate by a data rate offset defined by the distributed real-time application. A node of the communication network learns the defined data rate offset and provides a guaranteed minimum bitrate of the communication connection higher than a booked minimum bitrate of the communication connection by the learned data rate offset.

BRIEF DESCRIPTION OF THE DRAWINGS

Subject matter of the present disclosure will be described in even greater detail below based on the exemplary FIGURES. All features described and/or illustrated herein can be used alone or combined in different combinations. The features and advantages of various embodiments will become apparent by reading the following detailed description with reference to the attached drawings, which illustrate the following:

FIG. 1 schematically shows an entity diagram of a communication network being operated in a method according to an embodiment of the invention.

DETAILED DESCRIPTION

In accordance with an embodiment, the present invention suggests a method for operating a communication network which allows for supporting a distributed real-time application in efficiently using a booked MinGBR. Further embodiments of the invention are to provide computer program products.

In an embodiment, the present invention provides a method for operating a communication network, wherein a communication network provides a sender of a distributed real-time application and a receiver of the distributed real-time application with a communication connection, the distributed real-time application defining a minimum operable data rate, and the sender periodically transmits data packets to the receiver of the distributed real-time application via the provided communication connection at a data rate higher than the defined minimum operable data rate.

An aspect of the invention is a method for operating a communication network, wherein a communication network provides a sender of a distributed real-time application and a receiver of the distributed real-time application with a communication connection, the distributed real-time application defining a minimum operable data rate, and the sender periodically transmits data packets to the receiver via the provided communication connection at a data rate higher than the defined minimum operable data rate. The sender and the receiver are connected via the provided communication connection. The provided communication connection currently allows a data rate above the minimum operable data rate defined by the distributed real-time application.

According to the invention, the sender steadily determines a currently available bitrate of the communication connection and adjusts the data rate to a data rate lower than the determined currently available bitrate by a data rate offset defined by the distributed real-time application, and a node of the communication network learns the defined data rate offset and provides a guaranteed minimum bitrate of the communication connection higher than a booked minimum bitrate of the communication connection by the learned data rate offset. The currently available bitrate of the communication connection depends on the network resources allocated to the communication connection and a condition of the communication connection. The distributed real-time application dynamically changes the data rate dependent on the determined currently available bitrate in order to exploit the currently available bitrate.

However, the distributed real-time application does not completely use the currently available bitrate of the communication connection but instead intentionally uses only a defined proportion of the currently available bitrate. The proportion is defined by the data rate offset. The data rate offset provides a safety margin for precluding an increasing latency or jitter of the communication connection.

The node of the communication network may comprise a scheduler of the communication network. Learning the distance means knowing the data rate offset defined by the distributed real-time application. As the communication network can count on the data rate offset being applied by the distributed real-time application the communication network can apply a higher MinGBR, i.e. provide a higher guaranteed minimum bitrate, than the booked MinGBR without actually allocating the corresponding network resources to the communication connection. On the other hand, the distributed real-time application completely, i.e. efficiently, uses the booked MinGBR and, hence, transmits the data packets at least at the minimum operable data rate.

As a result, both paying the higher MinGBR and allocating expensive additional network resources are not needed in order to ensure a proper operation of the distributed real-time application at a low latency and a low jitter. In other words, data rate offset creates a win-win constellation for the communication network and the distributed real-time application.

Determining the currently available bitrate may comprise repeatedly, temporarily and gradually increasing the data rate on a trial basis and letting the determined maximum data rate be a data rate where a measured latency or a volatility of the measured latency of the communication connection increases. The sender may cause an operating system to affect a transmission of IP packets created from the transmitted data packets by means of a middleware in order to increase the data rate.

Adjusting the data rate may comprise reducing the data rate when a difference between the determined currently available bitrate and the data rate is smaller than the defined data rate offset and raising the data rate when a difference between the determined currently available bitrate and the data rate is larger than the defined data rate offset. In other words, the sender dynamically follows the currently available bitrate at a distance wherein the distance is given by the defined data rate offset.

In an embodiment, learning the defined data rate offset comprises querying the data rate offset from the distributed real-time application via an application programming interface of the distributed real-time application. The application programming interface configures the distributed real-time application to receive a query from the communication network, i.e. the node, and to send an answer to the communication network, i.e. the node. The node may steadily query the distance.

In another embodiment, learning the defined data rate offset comprises receiving the defined data rate offset in combination with a booking of the guaranteed minimum data rate. A network operator statically configures the communication network dependent on the learned data rate offset.

In still another embodiment, learning the defined data rate offset comprises steadily reading markers of IP packets corresponding to the transmitted data packets. The sender may cause an operating system via a middleware to mark IP packets created from, i.e., corresponding to the transmitted data packets before a transmission.

The sender may provide a percentage of the transmitted IP packets with a binary marker, the percentage indicating the data rate offset. The IP packets to be marked are selected statistically. An ECN (Explicit Congestion Notification) bit of an IP header of an IP packet may be used as the binary marker. For instance, marking 90% of the IP packets may indicate the data rate to be close to the minimum operable data rate while marking 10% of the IP packets may indicate the data rate to be far from the minimum operable data rate.

Alternatively, the sender may provide each transmitted IP packet with a marker value, the marker value indicating the data rate offset. A single DSCP (Differential Services Code Point) bit of an IP header of the IP packet or a plurality of DSCP bits may be used as the marker value. The marker value may be a 1-bit flag indicating a zero distance, i.e. indicating that the data rate equals the minimum operable data rate. The marker value may be a percentage value indicating a proximity of the data rate to the minimum operable data rate when the plurality of DSCP bits are used.

A second byte of the IP header is a so-called Type of Service (ToS) field which comprises a 6-bit DSCP portion and a 2-bit ECN portion.

Reducing the data rate may comprise reducing a frequency and/or a size of the data packets and increasing the data rate comprises increasing the frequency and/or the size of the data packets. The frequency indicates a number of data packets transmitted during a time interval, e.g. one second. The size indicates a number of bits of a data packet.

The sender preferably may transmit video frames as the data packets wherein a frame rate and/or a resolution of the video frames is reduced for reducing the data rate or increased for increasing the data rate. Each video frame corresponds to a single image of the video. The video frames may comprise i-frames which comprise a complete single image of the video and p-frames which depend on a preceding i-frame or a preceding p-frame and define a single image of the video together with the preceding i-frame or the preceding p-frames.

In an embodiment, the communication network measures the data rate of the transmitted data packets and steadily verifies the measured data rate to be lower than the currently available bitrate by the defined data rate offset. The communication network prevents the distributed real-time application from misusing the defined data rate offset and unduly stressing the communication network.

A cellular network as the communication network may provide the communication connection as a wireless connection, a mobile device as a terminal device executes an application frontend as one of the sender and the receiver and an edge cloud server as an application server executes an application backend as the other one of the sender and the receiver. A base transceiver station (BTS) of the cellular network provides the mobile device, e.g., a smartphone, a tablet, a notepad, a vehicle and the like, with a wireless radio connection.

Advantageously, the cellular network assigns a QoS feature to the communication connection or the cellular network assigns the communication connection to a slice of the cellular network or actively reduces a jitter of the communication connection by cooperating with the distributed real-time application. In other words, the communication connection may provide a low latency for the distributed real-time application. The low latency may be based on the QoS (Quality of Service) feature booked by a user of the terminal device.

Another aspect of the invention is a computer program product, comprising a storage medium with a program code. The storage medium may be configured as a CD (Compact Disc), a DVD (Digital Versatile Disk), a USB (Universal Serial Bus) stick, a hard drive, a RAM (Random Access Memory) chip, a cloud storage and the like.

According to the invention, the program code causes a computing device to carry out a method according to an embodiment of the invention as a node of a communication network in cooperation with a distributed real-time application when being executed by a processor of the computing device. Shortly, the program code configures the node for providing a guaranteed minimum bitrate of the communication connection higher than a booked minimum bitrate of the communication connection by a learned data rate offset.

A third aspect of the invention is a computer program product, comprising a storage medium with a program code.

According to the invention, the program code causes a computing device to carry out a method according to an embodiment of the invention as a sender or a receiver of a distributed real-time application in cooperation with a node of a communication network when being executed by a processor of the computing device. Shortly, the program code configures the sender or the receiver of the distributed application for adjusting a data rate of transmitted data packets to a data rate lower than a determined currently available bitrate by a data rate offset defined by the distributed real-time application and taught to the communication network.

An advantage of the inventive method is that it allows for supporting a distributed real-time application in efficiently using a booked MinGBR. Due to the efficient use of the booked MinGBR, both paying the higher MinGBR and allocating expensive additional network resources are not needed in order to ensure a proper operation of the distributed real-time application at a low latency and a low jitter.

It shall be understood that the features described previously and to be described subsequently may be used not only in the indicated combinations but also in different combinations or on their own without leaving the scope of the present invention.

The invention is described in detail by means of an exemplary embodiment and with reference to the drawings. Like components are indicated by like reference numerals throughout the drawings.

FIG. 1 schematically shows an entity diagram of a communication network 1. The communication network 1 comprises a node 10. The node 10 may be implemented by means of a computer program product. The computer program product comprises a storage medium with a program code. The program code causes a computing device to carry out a method according to the invention described below as the node 10 of the communication network 1 in cooperation with a distributed real-time application 2 (see below) when being executed by a processor of the computing device.

The communication network 1 may further comprise an application server 11 and a backbone 12. The communication network 1 may be connected to an internet 5. The communication network 1 is configured for providing a terminal device 4 with a communication connection 3. For instance, a cellular network as the communication network 1 provides the communication connection 3 as a wireless connection.

The terminal device 4 and the application server 11 may be configured for executing a distributed real-time application 2. For instance, a mobile device as the terminal device 4 executes an application frontend of the distributed real-time application 2 as one of a sender 20 of the distributed real-time application 2 and a receiver 21 of the distributed real-time application 2. The distributed real-time application 2 defines a minimum operable data rate.

The sender 20 or the receiver 21 of the distributed real-time application 2 may be implemented by means of a computer program product. The computer program product comprises a storage medium with a program code. The program code causes a computing device to carry out a method according to the invention described below as the sender 20 or the receiver 21 of the distributed real-time application 2 in cooperation with the node 10 of the communication network 1 when being executed by a processor of the computing device.

An edge cloud server as the application server 11 may execute an application backend of the distributed real-time application as the other one of the sender 20 and the receiver 21.

The communication network 1 is operated in a method according to an embodiment of the invention as follows.

The communication network 1 provides the sender 20 of the distributed real-time application 2 and the receiver 21 of the distributed real-time application 2 with a communication connection 3.

The sender 20 periodically transmits data packets 200 to the receiver 21 via the provided communication connection 3 at a data rate higher than the defined minimum operable data rate. The sender 20 may transmit video frames as the data packets 200.

The sender 20 steadily determines a currently available bitrate of the communication connection 3. Determining the currently available bitrate may comprise repeatedly, temporarily and gradually increasing the data rate on a trial basis and letting the determined maximum data rate be a data rate where a measured latency or a volatility of the measured latency of the communication connection 3 increases.

The sender 20 adjusts the data rate to a data rate lower than the determined currently available bitrate by a data rate offset defined by the distributed real-time application 2. Adjusting the data rate may comprise reducing the data rate when a difference between the determined currently available bitrate and the data rate is smaller than the defined data rate offset and raising the data rate when a difference between the determined currently available bitrate and the data rate is larger than the defined data rate offset.

Reducing the data rate may comprise reducing a frequency and/or a size of the data packets 200. Increasing the data rate may comprise increasing the frequency and/or the size of the data packets 200. Particularly, a frame rate and/or a resolution of the video frames is reduced for reducing the data rate or increased for increasing the data rate.

The node 10 of the communication network 1 learns the defined data rate offset and provides a guaranteed minimum bitrate of the communication connection 3 higher than a booked minimum bitrate of the communication connection 3 by the learned data rate offset. Learning the defined data rate offset may comprise querying the data rate offset from the distributed real-time application 2 via an application programming interface of the distributed real-time application 2. Learning the defined data rate offset may alternatively comprise receiving the defined data rate offset in combination with a booking of the guaranteed minimum data rate.

Learning the defined data rate offset may alternatively comprise steadily reading markers of IP packets corresponding to the transmitted data packets 200. For instance, the sender 20 provides a percentage of the transmitted IP packets with a binary marker, the percentage indicating the data rate offset. The sender 20 may alternatively provide each transmitted IP packet with a marker value, the marker value indicating the data rate offset.

The communication network 1 may measure the data rate of the transmitted data packets 200 and steadily verify the measured data rate to be lower than the currently available bitrate by the defined data rate offset.

Preferably, the cellular network assigns a QoS feature to the communication connection 3 or the cellular network assigns the communication connection 3 to a slice of the cellular network or actively reduces a jitter of the communication connection 3 by cooperating with the distributed real-time application 2.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 communication network
10 node
11 application server
12 backbone
2 distributed real-time application
20 sender
200 data packet
21 receiver
3 communication connection
4 terminal device
5 internet

The invention claimed is:

1. A method for operating a communication network, the method comprising:
  a communication network providing a sender of a distributed real-time application and a receiver of the distributed real-time application with a communication connection, the distributed real-time application defining a minimum operable data rate;
  the sender periodically transmitting data packets to the receiver via the provided communication connection at a data rate higher than the defined minimum operable data rate;
  the sender steadily determining a currently available bitrate of the communication connection, and adjusting the data rate to a data rate lower than the determined currently available bitrate by a data rate offset defined by the distributed real-time application;
  a node of the communication network learning the defined data rate offset and providing a guaranteed minimum bitrate of the communication connection higher than a booked minimum bitrate of the communication connection by the learned data rate offset.

2. The method according to claim 1, wherein determining the currently available bitrate comprises repeatedly, temporarily and gradually increasing the data rate on a trial basis and letting a determined maximum data rate be a data rate where a measured latency or a volatility of the measured latency of the communication connection increases.

3. The method according to claim 1, wherein adjusting the data rate comprises reducing the data rate when a difference between the determined currently available bitrate and the data rate is smaller than the defined data rate offset and raising the data rate when a difference between the determined currently available bitrate and the data rate is larger than the defined data rate offset.

4. The method according to claim 1, wherein learning the defined data rate offset comprises querying the data rate offset from the distributed real-time application via an application programming interface of the distributed real-time application.

5. The method according to claim 1, wherein learning the defined data rate offset comprises receiving the defined data rate offset in combination with a booking of the guaranteed minimum data rate.

6. The method according to claim 1, wherein learning the defined data rate offset comprises steadily reading markers of IP packets corresponding to the transmitted data packets.

7. The method according to claim 6, wherein the sender provides a percentage of the transmitted IP packets with a binary marker, the percentage indicating the data rate offset.

8. The method according to claim 6, wherein the sender provides each transmitted IP packet with a marker value, the marker value indicating the data rate offset.

9. The method according to claim 8, wherein reducing the data rate comprises reducing a frequency and/or a size of the data packets and increasing the data rate comprises increasing the frequency and/or the size of the data packets.

10. The method according to claim 1, wherein the sender transmits video frames as the data packets wherein a frame rate and/or a resolution of the video frames is reduced for reducing the data rate or increased for increasing the data rate.

11. The method according to claim 1, wherein the communication network measures the data rate of the transmitted data packets and steadily verifies the measured data rate to be lower than the currently available bitrate by the defined data rate offset.

12. The method according to claim 1, wherein a cellular network as the communication network provides the communication connection as a wireless connection, a mobile device as a terminal device executes an application frontend as one of the sender and the receiver and an edge cloud server as an application server executes an application backend as the other one of the sender and the receiver.

13. The method according to claim 12, wherein the cellular network assigns a QoS feature to the communication connection or the cellular network assigns the communication connection to a slice of the cellular network or actively reduces a jitter of the communication connection by cooperating with the distributed real-time application.

14. A tangible non-transitory computer-readable medium comprising a program code, the program code causing a computing device to carry out a method according to claim 1 as a node of a communication network in cooperation with a distributed real-time application when being executed by a processor of the computing device.

15. A tangible non-transitory computer-readable medium, comprising a program code, the program code causing a computing device to carry out a method according to claim 1 as a sender or a receiver of a distributed real-time application in cooperation with a node of a communication network when being executed by a processor of the computing device.

* * * * *